May 15, 1945.   W. J. CLIFFORD   2,376,122
FOAM-PRODUCING METHOD AND APPARATUS
Filed Sept. 4, 1941   2 Sheets-Sheet 1

INVENTOR
Wilfred James Clifford
by W. Philip Churchill
ATTORNEY

May 15, 1945.  W. J. CLIFFORD  2,376,122
FOAM-PRODUCING METHOD AND APPARATUS
Filed Sept. 4, 1941  2 Sheets-Sheet 2

INVENTOR
Wilfred James Clifford
BY
Philip Churchill
ATTORNEY

Patented May 15, 1945

2,376,122

UNITED STATES PATENT OFFICE 2,376,122

FOAM-PRODUCING METHOD AND APPARATUS

Wilfred James Clifford, Brentford, England, assignor, by mesne assignments, to Pyrene Development Corporation, Newark, N. J., a corporation of Delaware Application September 4, 1941, Serial No. 409,526
In Great Britain September 12, 1940

8 Claims. (Cl. 261—94)

This invention relates to the production of air foam by mechanically mixing water, air and a substance which will be referred to as a foam-forming liquid, although its function may be more that of stabilising incipient foam produced by the mixture of air and water. The invention is concerned with the production of foam by the use of a mixing body of the labyrinth type, through which the constituents are forced to form the foam, as first described in United States Patents Nos. 1,740,840 and 1,874,209. In practice, the water and foam-forming liquid are sometimes supplied separately and sometimes as a mixture or solution to the mixing body.

Apparatus including mixing bodies have been used to produce foam for allaying rock-drill dust. The air pressure has been used to force the liquid into the mixing body, and as the air pressure has necessarily been fairly high and the volume of foam required has been low, very small orifices have been provided to restrict the amounts of liquid and air that enter the mixing body. In practice these orifices are easily choked. Moreover, in this form of apparatus it is difficult or even impossible to vary the degree of expansion of the foam, that is to say, the ratio between the volume of the foam and the volume of its constituents, and the rate of production of the foam can be varied only by varying the air pressure.

According to the invention these drawbacks are overcome by supplying the water (either mixed with or separate from the foam-forming liquid) under a constant head that is independent of the pressure of the air or other gas. To achieve this result, the water may be maintained with a free surface at a constant height above the mixing body and that surface may be placed under the pressure of air supplied directly to the mixing body. The air may itself be used as the source of energy for supplying the water to maintain the constant head. As the pressure head under which the water is supplied is independent of that of the air supply it can be made small, for example, 18 inches of water, and in consequence accurate control of the relative amounts of water and air can be obtained without the use of very small orifices. In order to vary the degree of expansion of the foam, it is only necessary to insert a valve in the constant head connection to the mixing body.

In practice the air or other gas is usually supplied under constant pressure, e. g., from a pipe line, and as the water is supplied under a constant head it is not feasible to regulate the total amount of foam produced by regulating the pressure under which the constituents are forced through the mixing body. Moreover, it is undesirable to effect the regulation by means of a valve in the foam supply pipe as the foam is liable to break down at the valve. According further to the invention, the regulation of the rate of supply of foam is effected by varying the resistance offered by the mixing body. This may be done by making the mixing body in two or more parts arranged in series or parallel and providing valves so that the requisite resistance may be selected.

In order that the invention may be clearly understood and readily carried into effect, embodiments of apparatus in accordance therewith will now be described by way of example with reference to the accompanying drawings which show these apparatus diagrammatically.

Figure 1:
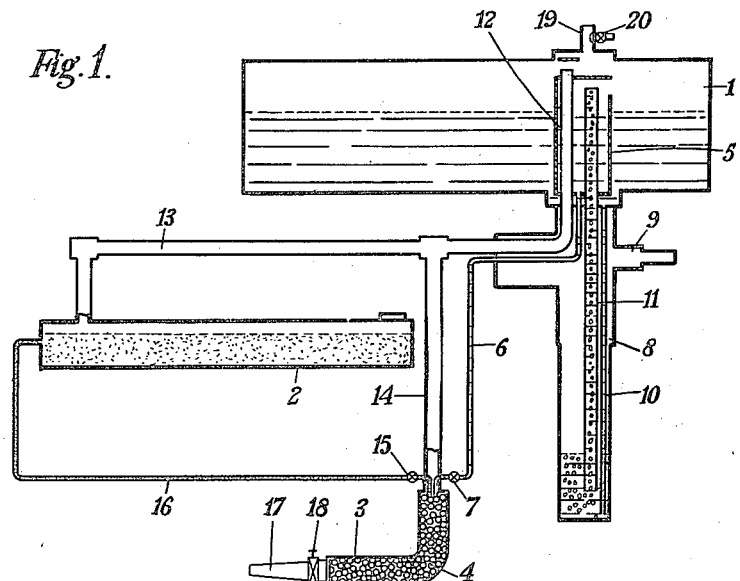
Figure 1 is a partly diagrammatic cross-sectional view of an apparatus for producing foam according to my invention.

The apparatus shown in Figure 1 includes a liquid container 1 which acts as a reservoir for water, a second container 2 which acts as a reservoir for the foam-forming liquid, and a mixing body of the labyrinth type 3 which is packed with lead shot 4 and which is connected to a foam supply pipe 17 controlled by a valve 18. The container 2 is made shallow in relation to its height above the mixing body so that the pressure head which it provides does not fall appreciably as the foam-forming liquid is consumed. The container 1 is closed and an open vessel 5 is placed within it. A constant head of water is maintained in this vessel 5 and a pipe 6, including a valve 7, runs from the bottom of the vessel to the mixing body.

A closed cylindrical air supply vessel 8 is secured to the underside of the container 1 and is connected by an inlet 9 to a compressed air pipe line or other source of air under pressure. A pipe 10 extends downwards from the bottom of the container 1 to the bottom of the air supply vessel 8, so that water can run down from the container to the air supply vessel. A further pipe or tube 11 extends upwards from a point close to the bottom of the pipe 10 through the bottom of the container 1 and the bottom of the vessel 5 to a point above the free surface of the water maintained in the vessel 5. The parts just described constitute an air-lift device which serves to deliver water into the vessel 5. Initially the container 1 is rather more than half full with water. When air is supplied under pressure to the air supply vessel 8 it drives water up the tube 11, and thereafter air bubbles into that tube so that the specific gravity of its contents is lowered and the mixture of water and air in it flows upwards. In this way water is maintained at a constant height, namely that of the upper edge of the vessel 5, and air under pressure is also introduced in the container 1. A pipe 12 runs from the air space in the container 1 by way of a branch 13 to the container 2 and by way of a branch 14 to the mixing body 3. When the apparatus is in operation, therefore, the air pressure is substantially the same on the free surface of the water in the vessel 5, on the surface of the foam-forming liquid in the container 2 and at the inlet end of the mixing body 3. It will be noted that the air pipes are of relatively large diameter so as to reduce the friction loss to a minimum, for this purpose. The proportions of water and foam-forming liquid that flow to the mixing body are therefore independent of the air pressure and as the air is itself supplied under constant pressure the proportions in which the constituents enter the mixing body are constant. If it is desired to vary them in order to vary the degree of expansion, the valve 7 may be adjusted as also may a valve 15 in the pipe 16 that leads from the container 2 to the mixing body.

As the water level in the container 1 drops, the height through which the water must be lifted so that it can overflow into the vessel 5 increases. When the lift is small, the amount of air required for the production of foam is generally enough to lift the water, but as the container 1 empties more air may be required for lifting the water than for producing the foam. The container 1 is therefore provided at the top with an air outlet 19 controlled by a valve 20 which can be left slightly open so as to let run to waste the air which has been used to raise the water but is not required for foam-producing purposes.

Figure 2:
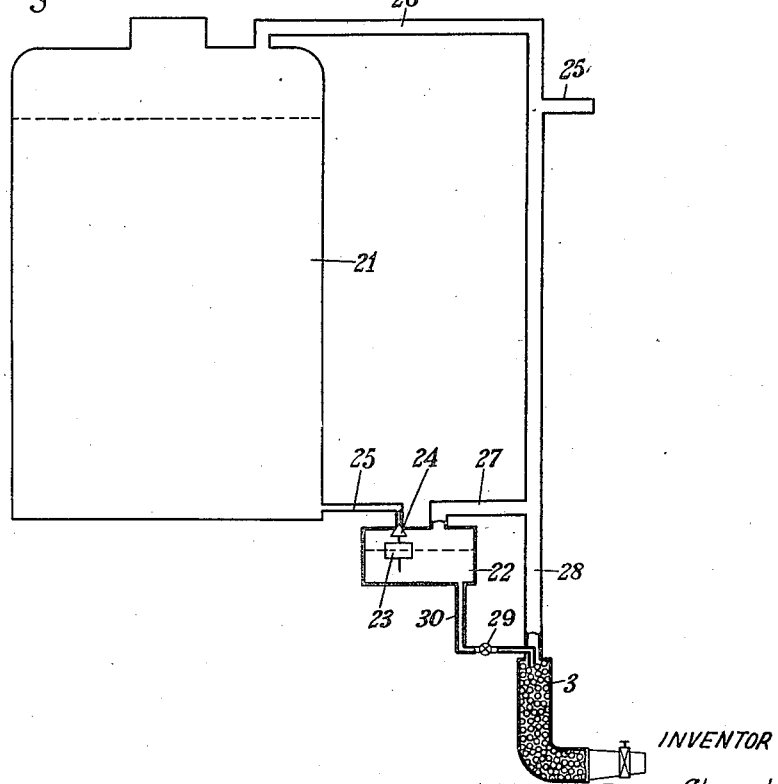
Figure 2 is a similar view of another embodiment of foam producing apparatus.

In the modified apparatus shown in Figure 2, a single container 21 is provided for both the water and the foam-producing liquid and different means are employed for maintaining the constant head. Here a float chamber 22 containing a float 23 carrying a needle valve 24 is provided below the container 21 and is connected to the latter by a pipe 25 controlled by the valve 24. For the rest, the arrangement is substantially the same as that shown in Figure 1, that is to say, air from a pipe 25a is supplied through a branch 26 to the top of the container 21, through another branch 27 to the float chamber 22 and through a third branch 28 to the mixing body 3. In this way, the air pressure is made the same at all the critical places so that the liquid is supplied under a constant head independent of the air pressure to the mixing body 3. A valve 29 is provided in a pipe 30 that runs from the bottom of the float chamber to the mixing body 3 and performs the same function as the valve 7 in the apparatus of Figure 1.

For dust-allaying purposes, foam expansions of from 8 to 20 with a foam volume of from one-half to one gallon per minute may be required. This involves the supply of not more than one pint of water per minute to the mixing body, so that it will readily be appreciated that it is a great advantage to be able to supply the water under so small a head as from 12 to 18 inches, as with such a head a water pipe of, for example, one-quarter inch diameter may be used.

Figure 3:
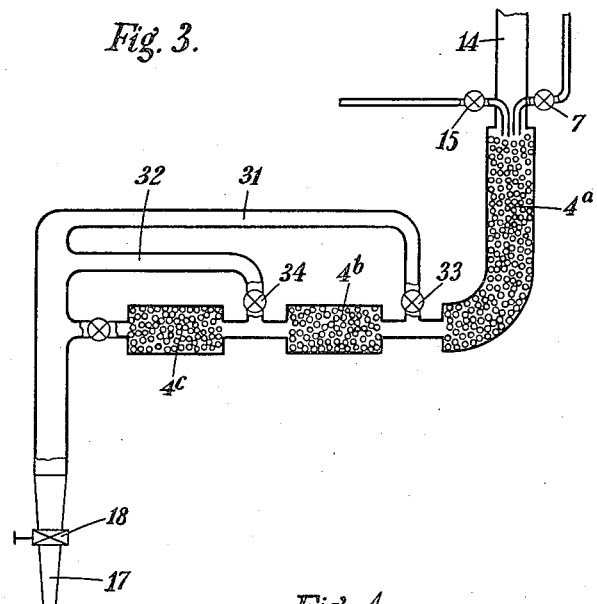
Figure 3 is a diagrammatic view of a series of mixing chambers that may be used with the apparatus in Figs. 1 or 2.

Figure 3 represents a modification of the apparatus described with reference to Figure 1, in which the mixing body is divided into three parts 4a, 4b, 4c, arranged in series and in which two short-circuiting pipes 31, 32 with control valves 33, 34 are provided. As will be evident, when both these valves are closed all three parts of the mixing body are in action, and the resistance is a maximum. If the valve 33 is opened the parts 4b, 4c are cut out and only the part 4a is in use. If the valve 33 is closed and the valve 34 is open, only the part 4c is cut out.

Figure 4:
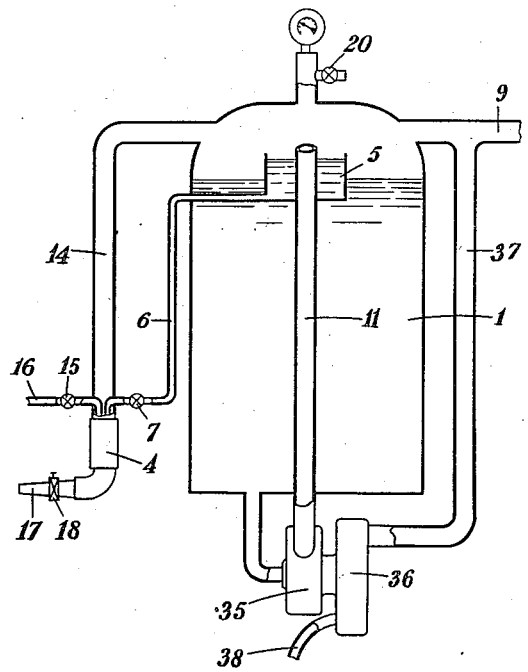
Figure 4 is a diagrammatic view of a further modification of foam making apparatus.

Although the invention is particularly valuable in the production of foam for allaying dust, it is by no means restricted to this and can indeed be used for producing foam for any purpose. Probably the commonest purpose for which foam is produced is for fire extinguishing, for which of course much larger volumes of foam are required than for allaying dust. Large apparatus working on the principles described can be used to produce fire-extinguishing foam, and in such a case it may be desirable to provide other means for supplying the water to the constant head device. For example, a turbine driven by the air under pressure may be used, the air being allowed to escape after driving the turbine. Such an arrangement is illustrated in Figure 4 in which the parts bearing the reference numerals shown also in Figure 1 have the same function. The water, however, is supplied through the pipe 11 to the vessel 5 by a pump 35 driven by the turbine 36, to which air is supplied and through a branch pipe 37 from the main air supply pipe 9, which in this case communicates directly with the upper art of the container 1. The exhaust pipe for air escaping from the turbine is indicated at 38.

The term "head" as used herein refers to the real or actual head or pressure produced by the height of the column of liquid above a given point, and is not used in the sense of an imaginary or equivalent head to indicate total pressure.

I claim:

1. An apparatus for producing air foam by mechanically mixing water, air and a foam-forming liquid, comprising a mixing body of the labyrinth type, a container for liquid, a connection between the container and the mixing body, means for maintaining a constant head of liquid with a free surface in the connection and means for admitting air or other gas under super-atmospheric pressure to both the mixing body and the free surface of liquid in the connection to maintain said mixing body and said free surface under substantially the same pressure.

2. An apparatus according to claim 1, in which the means for maintaining a constant head comprise an open vessel in the container and an air-lift device is provided to deliver water into this vessel from the container and at the same time to admit the air or other gas to the space above the surface of the liquid in the open vessel.

3. An apparatus according to claim 1, in which the container is used for the water supplied to the mixing body, a separate container is provided for the foam-forming liquid and means are provided for placing this container also under the pressure of the air or other gas.

4. A method of producing foam in which a gas and a foam producing liquid are forced through a mixing chamber of the labyrinth type comprising supplying the liquid to the mixing chamber under a constant liquid head and supplying the gas thereto under super-atmospheric pressure, said liquid head being maintained constantly effective and independent of the gas supply under pressure.

5. A method of producing foam in which a gas and a foam producing liquid are forced through a mixing chamber of the labyrinth type comprising supplying the liquid to the mixing chamber under a head that is maintained substantially constant, supplying gas under substantially constant super-atmospheric pressure to said mixing chamber, and balancing said pressure by an equal added force applied to said liquid.

6. Foam making apparatus comprising a labyrinth type mixing chamber, means for supplying gas under super-atmospheric pressure to said chamber, and means for supplying liquid to said chamber under a constant liquid head and means for imparting to said liquid a pressure in addition to said head equal to said super-atmospheric pressure, thereby rendering said liquid head independent of said gas pressure.

7. Foam making apparatus comprising a labyrinth type mixing chamber, a source of gas under super-atmospheric pressure, means utilizing said gas to maintain a supply of liquid under a constant head, means for supplying said liquid to said chamber, and means for supplying gas from said source under the same pressure to said chamber and to the surface of said constant head liquid supply.

8. Foam making apparatus comprising a plurality of labyrinth type mixing chambers connected in series, means for introducing into one of said chambers foam making gas and liquid under substantially constant pressure, and means for by-passing one or more of the other of said mixing chambers.

WILFRED JAMES CLIFFORD.